(12) United States Patent
Aylward et al.

(10) Patent No.: US 12,015,925 B2
(45) Date of Patent: Jun. 18, 2024

(54) DEVICE, COMPUTER PROGRAM AND METHOD

(71) Applicant: Sony Group Corporation, Tokyo (JP)

(72) Inventors: Conor Aylward, Stuttgart (DE); Hugo Embrechts, Stuttgart (DE); Dimitri Torfs, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/057,763

(22) Filed: Nov. 22, 2022

(65) Prior Publication Data

US 2023/0080732 A1 Mar. 16, 2023

Related U.S. Application Data

(62) Division of application No. 16/336,470, filed as application No. PCT/EP2017/072513 on Sep. 7, 2017.

(30) Foreign Application Priority Data

Sep. 28, 2016 (EP) .................................. 16191189

(51) Int. Cl.
| | | |
|---|---|---|
| H04L 29/06 | (2006.01) | |
| G06F 3/01 | (2006.01) | |
| G06F 3/03 | (2006.01) | |
| G06F 3/042 | (2006.01) | |
| G06F 21/31 | (2013.01) | |

(Continued)

(52) U.S. Cl.
CPC ............. *H04W 12/68* (2021.01); *G06F 3/011* (2013.01); *G06F 3/017* (2013.01); *G06F 3/0304* (2013.01); *G06F 3/0426* (2013.01);

*G06F 21/316* (2013.01); *G06F 21/36* (2013.01); *G06V 40/11* (2022.01); *G06V 40/67* (2022.01); *H04W 12/06* (2013.01); *H04W 12/065* (2021.01); *H04W 12/65* (2021.01); *H04L 63/083* (2013.01);

(Continued)

(58) Field of Classification Search
CPC ............................. H04W 12/68; G06F 21/316
See application file for complete search history.

(56) References Cited

U.S. PATENT DOCUMENTS

| | | |
|---|---|---|
| 5,610,631 A | 3/1997 | Bouton et al. |
| 6,819,219 B1 | 11/2004 | Bolle et al. |

(Continued)

FOREIGN PATENT DOCUMENTS

| | | | | |
|---|---|---|---|---|
| CN | 105264536 A | 1/2016 | | |
| EP | 2731371 A2 * | 5/2014 | ............. | H04L 63/18 |

(Continued)

OTHER PUBLICATIONS

Bailey et al., ""Typing" passwords with voice recognition: How to authenticate to Google Glass" pp. 1-2.

(Continued)

*Primary Examiner* — Evans Desrosiers
(74) *Attorney, Agent, or Firm* — XSENSUS LLP

(57) ABSTRACT

A device for authenticating a user is described that comprises a sensor configured to measure the movement of a user in response to the interaction of the user with a displayed image and controller circuitry configured to authenticate the user in response to a positive comparison between the movement of the user and a stored movement associated with the user.

14 Claims, 7 Drawing Sheets

(51) Int. Cl.
  *G06F 21/36* (2013.01)
  *G06V 40/10* (2022.01)
  *G06V 40/60* (2022.01)
  *H04W 12/06* (2021.01)
  *H04W 12/065* (2021.01)
  *H04W 12/65* (2021.01)
  *H04W 12/68* (2021.01)
  *H04L 9/40* (2022.01)
  *H04W 12/08* (2021.01)
  *H04W 12/61* (2021.01)

(52) U.S. Cl.
  CPC ...... *H04L 63/0861* (2013.01); *H04L 63/0876* (2013.01); *H04W 12/08* (2013.01); *H04W 12/61* (2021.01)

(56) References Cited

U.S. PATENT DOCUMENTS

| | | | |
|---|---|---|---|
| 9,524,385 B1* | 12/2016 | McKinley | G06F 3/167 |
| 10,649,653 B2 | 5/2020 | Creager et al. | |
| 2002/0091937 A1 | 7/2002 | Ortiz | |
| 2006/0205505 A1 | 9/2006 | Hussaini et al. | |
| 2009/0054146 A1 | 2/2009 | Epstein et al. | |
| 2009/0102603 A1 | 4/2009 | Fein et al. | |
| 2013/0182902 A1 | 7/2013 | Holz | |
| 2014/0094973 A1* | 4/2014 | Giaimo, III | F04D 27/004 381/56 |
| 2014/0125574 A1 | 5/2014 | Scavezze et al. | |
| 2014/0314242 A1* | 10/2014 | Gollbach | H04R 1/1041 381/71.6 |
| 2014/0337634 A1 | 11/2014 | Starner et al. | |
| 2014/0369572 A1 | 12/2014 | Setlak | |
| 2015/0031298 A1 | 1/2015 | Holman et al. | |
| 2015/0062086 A1 | 3/2015 | Nattukallingal | |
| 2016/0065558 A1 | 3/2016 | Suresh et al. | |
| 2016/0080936 A1 | 3/2016 | Rachuri et al. | |
| 2016/0085958 A1 | 3/2016 | Kang | |
| 2016/0094974 A1 | 3/2016 | Muttik et al. | |
| 2016/0140553 A1 | 5/2016 | Faith et al. | |
| 2016/0179205 A1 | 6/2016 | Katz | |
| 2016/0188861 A1 | 6/2016 | Todeschini | |
| 2018/0089519 A1 | 3/2018 | Raziel et al. | |
| 2019/0379671 A1 | 12/2019 | Sundar | |

FOREIGN PATENT DOCUMENTS

| | | |
|---|---|---|
| EP | 2731371 A2 | 5/2014 |
| EP | 2731371 A3 | 10/2016 |
| WO | 2015/080339 A1 | 6/2015 |
| WO | WO-2018057252 A1 | 3/2018 |

OTHER PUBLICATIONS

Karapanos et al., "Sound-Proof: Usable Two-Factor Authentication Based on Ambient Sound", 3 pages.
International Search Report dated Jan. 19, 2018 PCT/EP2017/072513, filed on Sep. 7, 2017, 16 pages.
Office Action dated Feb. 19, 2020 in European Patent Application No. 17 764 389.7, 5 pages.
Office Action dated Aug. 19, 2020, in corresponding European patent Application No. 17 764 389.7, 6 pages.

* cited by examiner

| User Identity 505 | Device Identifier 510 | Location of Device 515 | Confidence Score 520 |
|---|---|---|---|
| User 1 | 1<br>2<br>3 | Close<br>Not Close<br>Close | 85%<br>82%<br>75% |
| ⋮ | ⋮ | ⋮ | ⋮ |

FIG. 6

DEVICE, COMPUTER PROGRAM AND METHOD

CROSS-REFERENCE TO RELATED APPLICATIONS

The present application is a divisional of U.S. patent application Ser. No. 16/336,470, filed Mar. 25, 2019, which is based on PCT filing PCT/EP2017/072513, filed Sep. 7, 2017, which claims priority to EP 16191189.6, filed Sep. 28, 2016, the entire contents of each are incorporated herein by reference.

BACKGROUND

Field of the Disclosure

The present technique relates to a device, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Authentication of a user is an important issue in modern technology. With more and more sensitive information being stored, hackers and malicious attackers are becoming more sophisticated in circumventing known authentication techniques. This is particular the case with new emerging technologies such as wearable technology and augmented and virtual reality where the constrained interfaces make it difficult to authenticate the user with certainty.

Additionally, in some instances where sound is used to authenticate the user, that sound information may be hacked revealing sensitive information about the user or his or her environment.

It is an aim of the disclosure to address these two issues.

SUMMARY

According to one aspect of the disclosure, there is provided a device for authenticating a user, comprising a sensor configured to measure the movement of a user in response to the interaction of the user with a displayed image and controller circuitry configured to authenticate the user in response to a positive comparison between the movement of the user and a stored movement associated with the user.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 shows a schematic diagram of a template according another embodiment of the disclosure.

DESCRIPTION OF THE EMBODIMENTS

Figure 1:
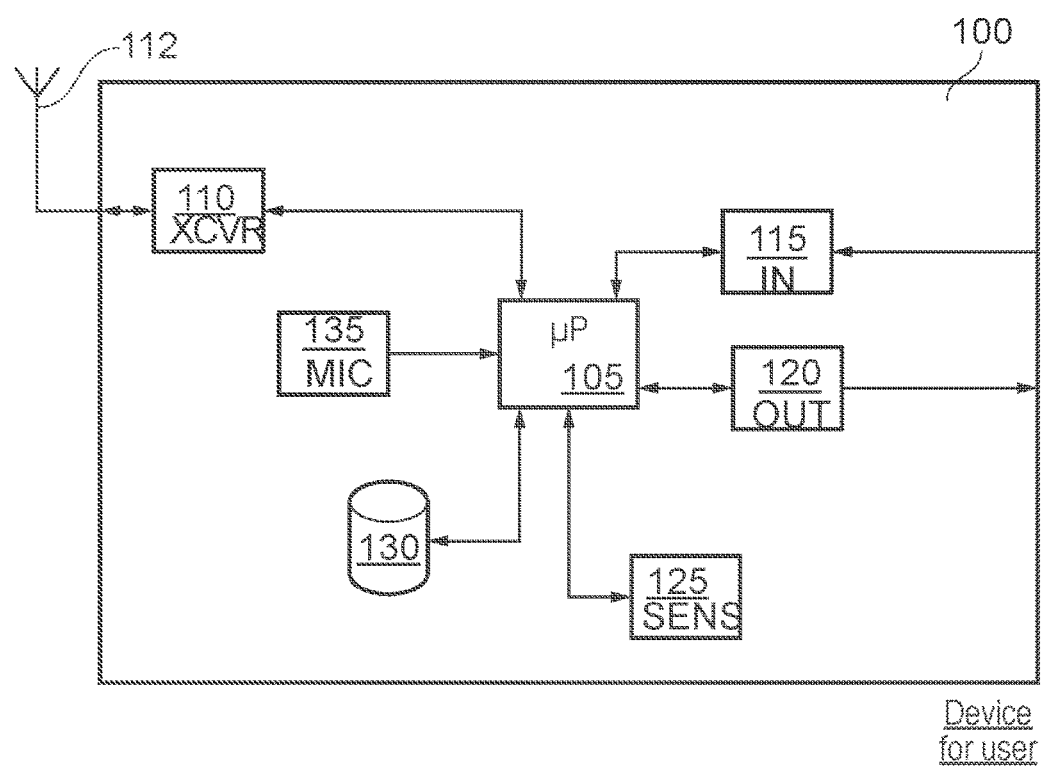
FIG. 1 shows a device 100 according to embodiments of the present disclosure.

Referring now to the drawings, wherein like reference numerals designate identical or corresponding parts throughout the several views.

FIG. 1 shows a device 100 according to embodiments of the disclosure.

In embodiments of the disclosure, the device 100 is a wearable device such as a fitness band or smartwatch which the user wears that comprises a controller 105. Of course, the device 100 is not so limited and may be any device 100 with which the user interacts, such as a hub like the Xperia® Agent.

The controller 105 may be implemented as controller circuitry comprising hardware that is configured to perform certain method steps. The method steps are defined by computer readable code that is stored within storage 130 attached to the controller 105. The storage 130 may be optically readable storage or may be solid state storage or the like.

Also connected to the controller 105 is a transceiver 110. The transceiver comprises circuitry that allows the device 100 to communicative with other devices and/or a network. This communication, in embodiments, will be wireless and may be performed using WiFi, Bluetooth, NFC, cellular communication or the like. An antenna 112 is provided to facilitate such communication.

Additionally attached to the controller 105 is a microphone 135. The microphone 135 detects the sound from the location of the device 100. This sound may be a voice command from a user or, in an embodiment, may be the ambient sound of the device 100. The "ambient sound" is a term known to the skilled person and means the background sound which is present at the location of the device 100 but which is not an instruction to the device 100. The microphone 135 may be embodied as microphone circuitry and may be a capacitive or a resistive type microphone.

Additionally connected to the controller 105 are sensors 125. These sensors may be embodied as modules or circuitry located within the device 100 that perform certain functions and quantify certain physical or environmental conditions presented to or asserted on the device 100. Examples of sensors include accelerometers, barometers, gyroscopes and the like. In embodiments, other sensors include image sensors that capture an image of the surroundings of the device 100. These types of sensors are known to the skilled person.

Additionally connected to the controller 105 is a user output module 120. The user output module may be a display, or connected to a display, that provides a visual output. An example of this is if the device 100 is a headset, such as an augmented reality headset, whereby the user output module 120 is a head-up display where a graphic is overlaid over a real world scene. Additionally or alternatively, the user output module 120 may be a haptic feedback device that presents the user with a specific vibration indicating a certain output. However, any output that can be understood by the user can be provided by the user output module 120.

Additionally connected to the controller 105 is a user input module 115. The user input module 115 may be a touch screen wherein the user instructs the device 100 to perform certain functions using a touch screen mechanism. Alternatively, or additionally, the user input module 115 may be an image sensor (which may be the same or different to one embodied as a module in sensor 125) that captures an image of the user interacting with an object overlaid on an augmented reality display. For example, in this particular embodiment, the user input module 115 is an image sensor that captures the position of the user's hand and acts as a gesture recognition module. That is, the movement and position of the user's hand will be captured and certain actions performed in response to the captured movement and position.

In particular, in embodiments of the present disclosure, the device 100 is used as a device for authenticating the user. As will be explained, the authentication, in embodiments, is performed by analyzing the movement and/or physical (sometimes referred to as "physiological") traits of the user when interacting with a displayed image of an object. The object may be provided on the user output module 120 as, for example, a 3D object in free-space. In this case, the provision of the object in 3D allows the user to have a large variation in interaction with the virtual object. Alternatively, the object may be displayed on a surface. For example, the Xperia® Projector projects objects onto a surface such as a desk or a wall.

Figure 2:
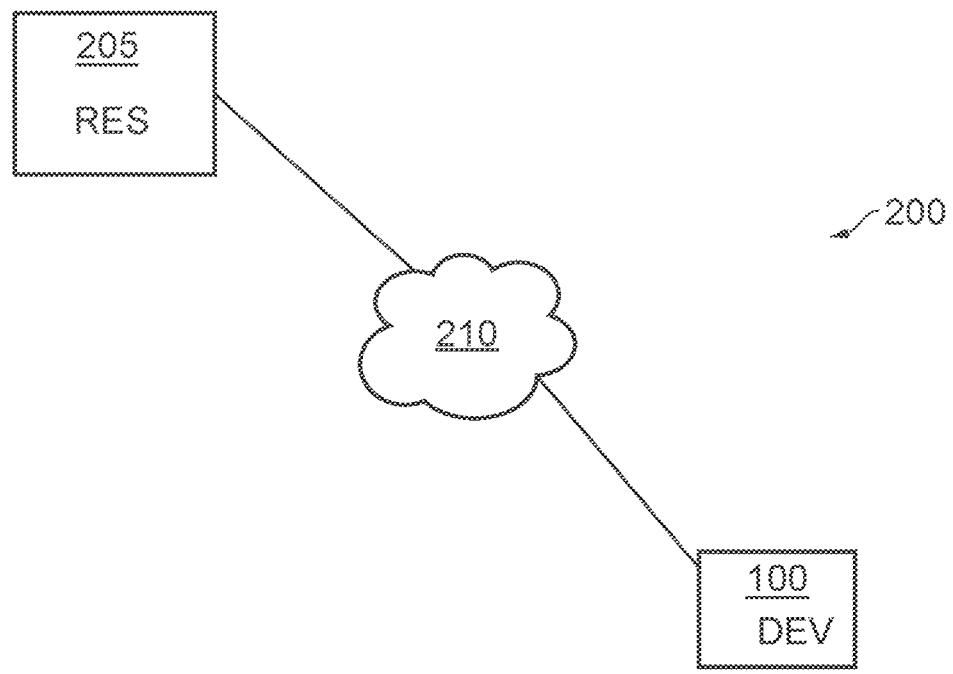
FIG. 2 shows a system 200 according to embodiments of the present disclosure

FIG. 2 describes a system 200 according to embodiments of the disclosure. The system of embodiments of the disclosure include a resource 205 which may be a server located in a cloud provided by a cloud based service provider. Alternatively, the resource 205 may be a controlling device which is located in a network to which the device 100 is connected. In other words, the resource 205 may be located on the cloud and may provide services to the device 100 such as authentication or storage of user profiles. Alternatively, the resource 205 may be located on a local network and the resource 205 may be a hub that contains equivalent information. An example of this hub is an Xperia Agent or the like. In examples, the hub may be used to authenticate the user before granting access to the device 100. In this instance, the user will interact with a virtual object created by the hub and in dependence upon the interaction, the user will be granted access to the device 100.

The device 100 is connected to the resource 205 via a network 210. The network 210 may therefore be a local area network, a wide area network or the internet.

The operation of embodiments of the disclosure will now be described.

Figure 3:
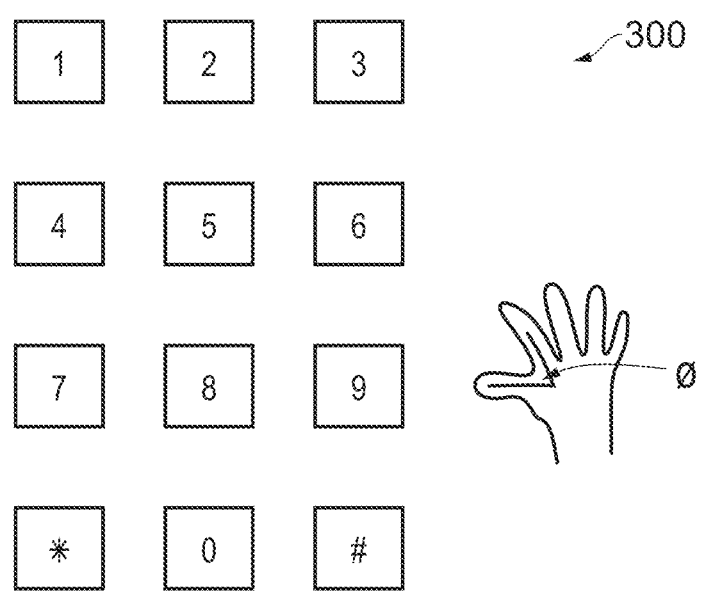
FIG. 3 shows a schematic diagram of a virtual keyboard of embodiments.

Referring to FIG. 3, a virtual keyboard 300 is shown. In embodiments, the virtual keyboard is the displayed image with which the user interacts. However, the disclosure is not so limited as will be explained later.

Further, although the virtual keyboard 300 in FIG. 3 is a numeric keypad that includes numbers 0-9, the keypad may contain letters, symbols, colours, shapes or any kind of pattern. As the skilled person would also appreciate, the numeric keypad is presented to the user in numerical sequence. However, it will be appreciated that the keypad may be randomised so that the numbers are not presented in numerical order. This reduces the likelihood of a third party determining a user's personal identification number (PIN hereinafter).

The user interacts with the virtual keyboard 300 using their hand or a stylus or pointer device. As noted above, in embodiments, the virtual keyboard 300 is displayed using a projection mechanism that projects the virtual keyboard 300 onto a surface with which the user interacts. In other words, the virtual keyboard is not a physical keyboard but is projected by the device 100 (or another device) onto a surface. An example of this is the Xperia projector which projects or displays an object onto a surface such as a desk and the user interacts with the object. Alternatively, in the context of augmented reality or virtual reality, the device may present the user with a virtual keyboard (as one example of an object) in augmented reality space and the user will interact with the object. The mechanism by which the object is projected or displayed is known and so will not be explained in any detail.

Referring back to FIG. 3, in embodiments of the disclosure, a user's hand is shown interacting with the virtual keyboard 300. In this instance, an image sensor within the device 100 captures an image of the user's hand and the controller 105 performs object recognition on the user's hand. Of course, it is envisaged that the image sensor may be an array of sensors which may be used to capture depth information as is known. This provides increased flexibility with regard to interaction with a virtual object. The controller 105 identifies the user's fingers on the detected hand and determines the angle between the thumb and the forefinger at a certain position of the hand. This is denoted in FIG. 3 as φ. Additionally, the controller 105 identifies other physical traits of the user's hand in a certain position such as the angle between the forefinger and the middle finger, the angle between the middle finger and the thumb, or other physical traits like the number of fingers on a hand and the length of the user's fingers (either absolute length or relative length), size and proportion of the user's palm and so on.

Additionally, the device 100 recognizes other physical traits of the user's hand such as skin colour, blemishes on the hand such as moles or scars or the like. This may be achieved using pattern matching whereby the captured image is compared with a stored template of the user's hand which will be explained later.

Moreover, the device 100 recognizes which hand is being used to interact with the virtual keyboard by identifying the position of the thumb and determining whether the user's right hand or left hand is being used. In other words, the device 100 recognizes which hand is dominant for the user.

The device also performs object tracking which identifies movement of the user's hand as the user interacts with the keyboard. The specific method for performing object tracking is known and will not be explained for brevity. However, the device 100 identifies how the user rotates their hand and wrist and how much rotation in the wrist has occurred when the user enters the PIN on the virtual keyboard. More generally, the device 100 detects the movement of the user and how the user interacts with the displayed object.

As the user moves his or her hand over the virtual keyboard 300, the device analyses the amount of time that the user's forefinger (which, in embodiments, the user will use to press the virtual keyboard 300) hovers over each key. So, the device 100 tracks the user's hand over the virtual keyboard 300 and measures the movement of the user's hand over the virtual keyboard 300. Further the physical characteristics of the user's hand such as the angle between the user's respective fingers are also analyzed. In other words, the manner in which the user interacts with the virtual keyboard 300 is analyzed by the device 100. So, the device 100 determines the speed at which the user's hand moves over the keyboard and the amount of time that the user hovers over each key when pressing the key. The method by which the user interacts with the virtual keyboard 300 is unique to the user. This is difficult for an unauthorized third party to copy. It is envisaged that the analysis of the user's movement and interaction with the displayed object may be used solely to authenticate the user. Alternatively, the analysis of the user's movement and interaction with the displayed object may be used as an additional form of authentication to the entry of a PIN or other passcode. In other words, in order to authenticate the user, the user must enter the correct PIN or other passcode in the correct manner. This improves known techniques of authentication which are liable for spoofing where only a PIN or passcode is entered.

In addition, the keypad will be placed at a similar position within the user's field of view each time the keypad is displayed. This is to ensure consistency of the hand position between consecutive captured movements. In other words, placing the keypad in the lower half of the user's field of view may provide different hand movements to the situation where the keypad is placed in the upper half of the user's field of view.

Figure 4:
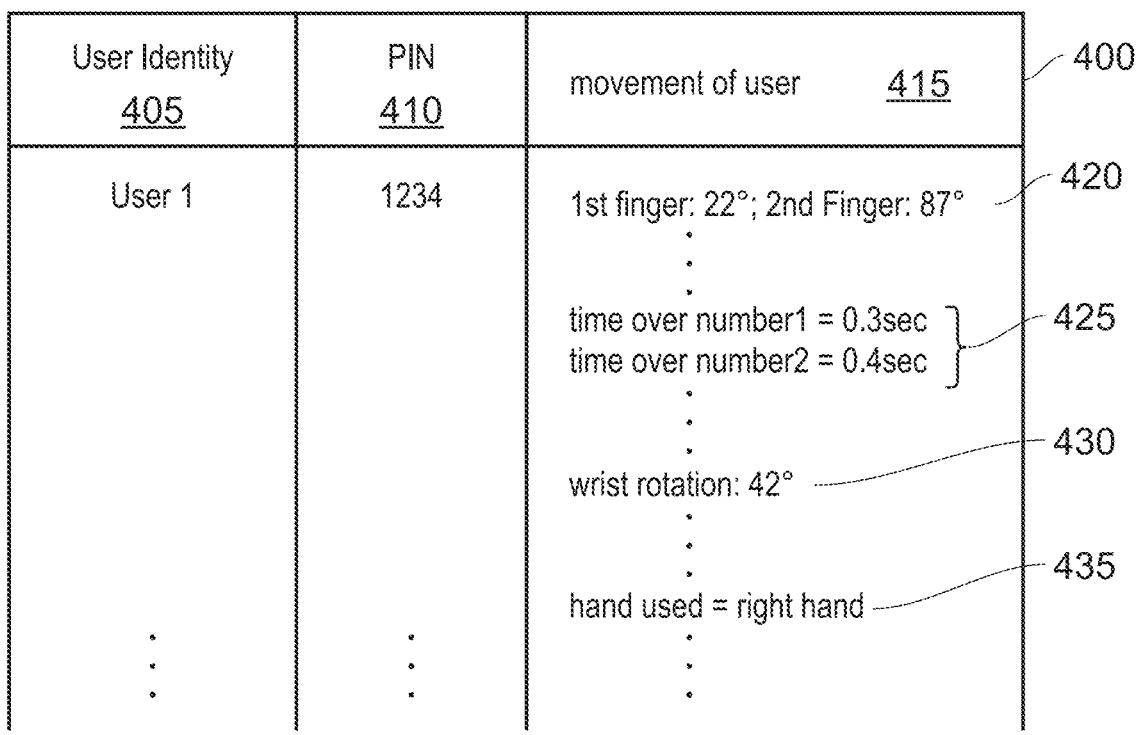
FIG. 4 shows a schematic diagram of a template storing user information according to embodiments.

FIG. 4 shows a table 400 that is stored within the storage 130 of device 100. The contents of the table 400 are a template that defines an authorized user and is populated during a training phase of the system for any one object interaction. During the training phase, a user who is known to be authentic is presented with a virtual keyboard or other displayed object. The authentic user then trains the system by interacting with the displayed object one or more times. Of course, it is envisaged that there may be two or more different object interactions stored within the table. For example, a second object interaction may be the user putting a virtual key in a virtual lock. However, for the purposes of clarity, only a single object interaction will be described.

The table 400 has a user identity column 405 which identifies each user uniquely. In the example of FIG. 4, the first user is identified as "User 1". A number of parameters are associated with that user. These are also stored in table 400 which may be embodied as a database. Of course, the disclosure is not so limited. For example, in the field of neural network and machine learning, the user characteristics within the table form a unique user signature or behaviour. The confidence in an authentication score for the user may be maintained in the internal thresholds and states of a machine learning or neural network model. In the case of a neural network, the inputs are selected that best correlate to the output to authenticate the user. This means that the inputs to the neural networks for one user may be very different to those for another user. So, and as will be appreciated, there is not one algorithm used for all users but rather there will be many algorithm variations used combined with differences in user inputs to authenticate between many users.

The first parameter is a password, PIN or passcode that includes numbers, alphanumeric characters and the like. In the example of FIG. 4, this is "1234" and is stored in the column "PIN" 410.

Additionally associated with the user profile is the movement and physical characteristic of the user. This is stored in column 415. In the example, the physical traits of the user when entering the passcode or pin during the training phase are stored. For example, the angle between the user's thumb and the first finger is identified as 22° and the angle between the user's second finger and the thumb is identified as 87°. This is identified using object detection during the training phase. This is stored in row 420.

Other physical parameters and traits are stored within column 415. For example, the time over which the user hovers before pressing each number of their PIN is noted in row 425. For example, the time of hover over number 1 in the PIN is 0.3 seconds and the time hovering over number 2 is 0.4 seconds.

Additionally noted in column 415 are other physical characteristics of the user such as the wrist rotation in row 430 and even other physical characteristics such as colour of skin and skin blemishes. In the example embodiment, the wrist rotation is 42°. Finally, the dominant hand of the user is noted in row 435 which is in this case, the right hand.

The purpose of the table 400 is to store the template of the user's interaction with the virtual keyboard 300. As noted above, the template is derived during the training phase where not only a PIN or passcode is determined or stored in 410 but also the physical characteristics and traits of the user and how the user interacts with the virtual keyboard are also stored. This template is stored securely in the device 100. Alternatively or additionally, the table or template 400 may be stored in the resource 205 or on the Cloud. The contents of the table 400 may be encrypted for additional security.

After populating the table during the training phase, a user may be authenticated. This is during the authentication phase where a user interacts with the displayed virtual keyboard 300 (or other object). During this phase, the device 100 identifies the PIN code or passcode that is entered by the user. In addition, or alternatively, the physical traits of the user such as the position of the forefinger relative to the thumb and the amount of time taken by the user to hover over a particular key is also identified and compared with the stored template 400. It is on this basis that the user is authenticated as will be explained.

It is important to note here, that the movement of the user may be used to authenticate the user alone. In other words, the user may be authenticated if the movement of the user during entry of a passcode is the same as the movement of the user 415 stored within table 400. Of course, for added security, the entered passcode should be the same as that stored in column 410.

In order to authenticate the user, the measured movements must be within a predetermined threshold of the stored movement. For example, for the user to be authenticated to a first level of confidence, the angle between the thumb and forefinger must be within 0.5° of that stored in the table 400. However, if the user is to be authenticated to a second, higher, level of confidence, the angle between the thumb and forefinger must be within 0.3°. The level of confidence may be set by the user or by the resource 205. So, for more sensitive information such as access to banking information where a high level of confidence is required, the user would be authenticated to the second level of confidence. However, if the user simply wants access to non-sensitive information such as stored music, the first level of confidence will suffice.

In addition, the level of confidence may be increased by providing multiple authentication techniques. For example, for highly sensitive data such as medical data, a third, even higher, level of confidence may be required. In this instance, the PIN entered by the user will match the PIN stored in column 410 and the angle between the user's thumb and forefinger will be within 0.3° of the stored value.

It should be noted here that various other levels of confidence may be derived using the other physical characteristics. For example, the hover time over the various keys may be used in conjunction with the various angles between fingers to generate numerous confidence levels. In addition, some physical characteristics are very particular to a user and so higher levels of weighting may be applied to these characteristics. For example, skin blemishes are very particular to a particular person, and are quite reliably detected. On the other hand, the dominant hand of a user is less unique to the user. Therefore, a high weighting may be applied to the skin blemish characteristic compared to the dominant hand characteristic.

Figure 5:
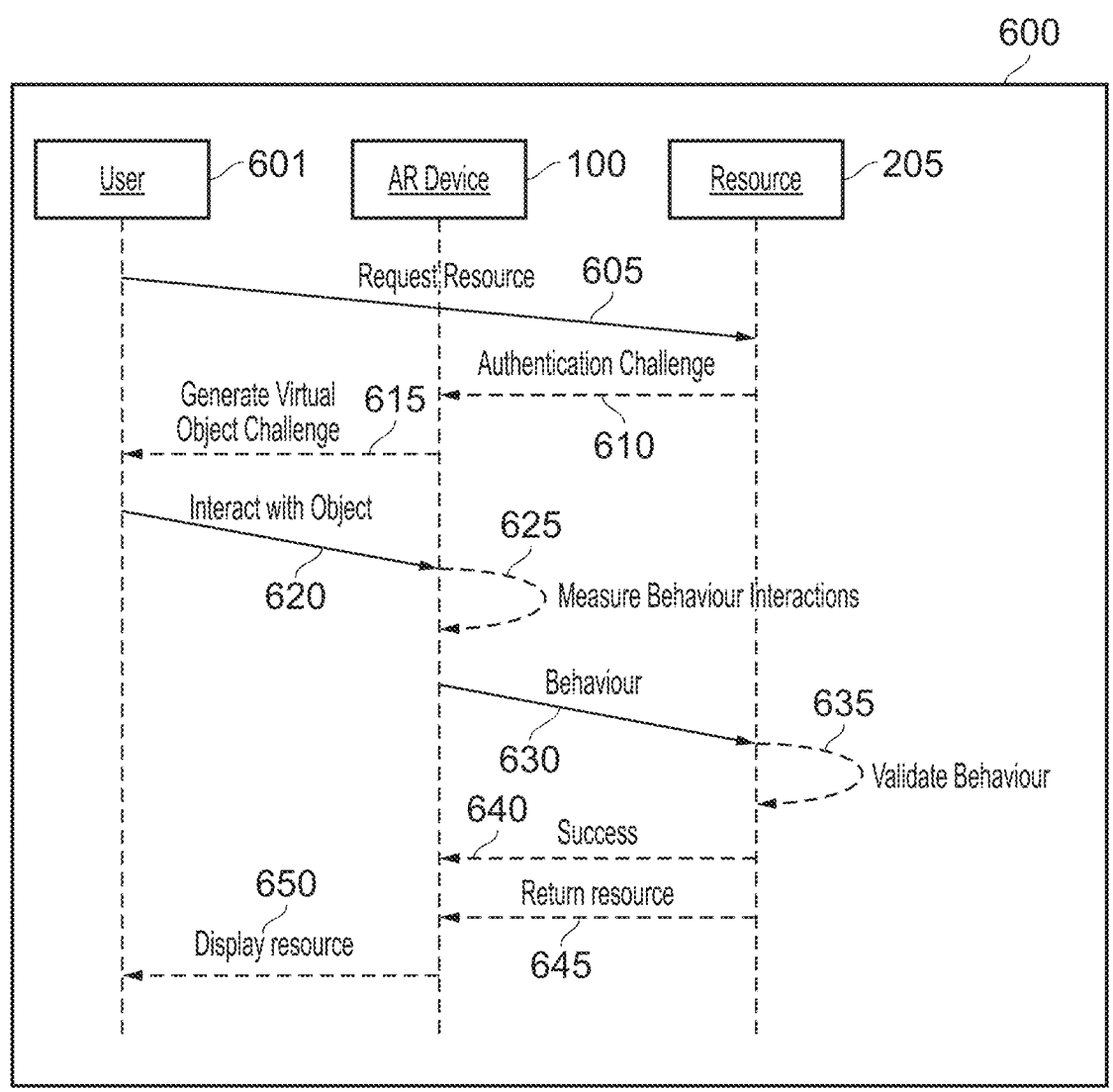
FIG. 5 shows a process explaining according to embodiments of the disclosure.

FIG. 5 shows a flow diagram explaining the authentication process associated with this embodiment.

The process 600 begins when a user 601 sends a request to resource 205. This may be for access to sensitive information such as via a banking application. This is noted in the request resource step 605.

The resource 205 will then present an authentication challenge to the device 100 in step 610. The type of challenge and the level of confidence required will be defined by the resource 205.

In embodiments already discussed, the authentication challenge is the entry of a PIN or passcode. However, the disclosure is in no way limited to this and other authentication challenges may include measuring how the user inserts a key into a lock or interacts with shapes such as building blocks or how the user presses a certain array of coloured buttons or any kind of interaction with an image or virtual device. The selection of the authentication challenge may be specific to the resource 205. For example, an online store may request that a passcode or PIN may be entered in order for the user's identity to be authenticated. Alternatively, the resource may randomly choose an authentication challenge that has already been performed by the user during the training phase or uses the same motion as a challenge for which training has already taken place.

This authentication challenge is presented to the device 100, in embodiments along with the level of confidence required and the device 100 generates the challenge in step 615. In the specific embodiment described, the device 100 presents the user with the virtual keyboard 300.

The user then interacts with the object in 620. This is shown in FIG. 3 whereby the user enters a PIN on the virtual keyboard 300.

During this time, the user's interaction is measured in step 625. In other words, the device 100 captures the user's physical traits when interacting with the virtual keyboard.

The captured behaviour is then either compared with the user profile stored within the device 100 or, in this case, is sent in step 630 to the resource 205 for comparison with the stored table 400. In other words, the captured behaviour is compared against the template stored in table 400 either in the device 100 or, in this case, resource 205.

The comparison with the template validates the behaviour of the user as being that of the user 1 in steps 635. If the behaviour is validated in step 635, then the authentication of the user is complete. It should be noted here that the authentication is completed to the required level of confidence. As explained above, for example, for the user to be authenticated to a first level of confidence, the angle between the thumb and forefinger must be within 0.5° of that stored in the table 400. However, if the user is to be authenticated to a second, higher, level of confidence, the angle between the thumb and forefinger must be within 0.3°. A success 640 is then provided to the device 100 and the resource 205 returns the required data such as authorization that the transaction is complete or returns the content stored within the resource 205. This occurs in step 645 and the resource or the success of the authentication is then displayed to the user 601 in step 650. The process then ends.

Although the above describes the image sensor within the device 100 capturing the user's movement, the disclosure is not so limited. In fact, some movement information or physical traits may be provided by a different wearable device. For example, the wrist rotation may be measured by a wearable wrist strap.

In a different embodiment of the disclosure, authentication of the user is performed by determining the proximity of the device 100 to another device that is already known to be close to the user. In order to determine whether the other device is close to the user, a behavioumetric fingerprint, or biometric fingerprint is taken on that device. Moreover, the device that is known to be close to the user may be attached to the user or may be embedded within the user (for example under the skin of the user). In known techniques, ambient sound is detected whereby the content of the sound is captured in both devices (that is the device which is known to be close to the user and the device 100) and compared. In the event that the sounds are the same, it is determined that the devices are close together and therefore the authentication of the user is complete.

However, this has several disadvantages. Firstly, the ambient sound contains a large amount of personal information such as content of conversation and people's voices within that conversation. Additionally, environmental sounds such as announcements can indicate the location of the user. This may be compromised and may risk the security of the user. It is an aim of the present disclosure to address this.

Figure 7:
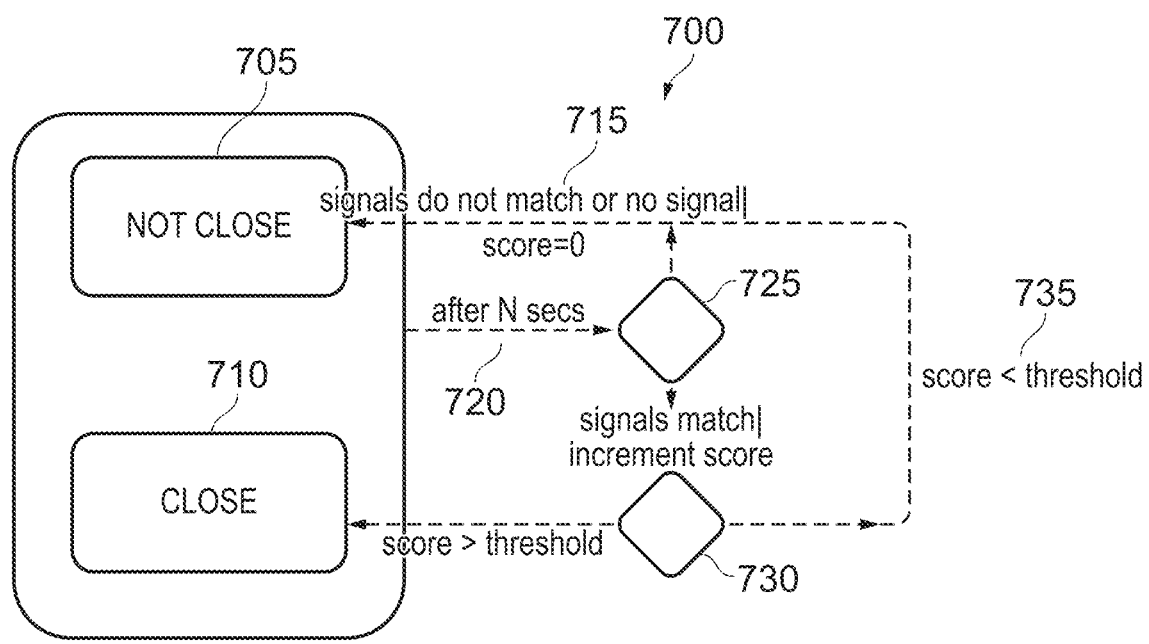
FIG. 7 shows a state diagram explaining the mechanism for maintaining the confidence score.

Broadly speaking, the disclosure uses the energy in the audio signals to authenticate the user. In other words, the raw audio is not compared but rather the energy content in the audio is compared. The energy content is sometimes referred to as the sound volume or sound intensity. This reduces the information content within the audio signal but provides enough information that authentication of the proximity of the device of the user can be performed. This has an additional benefit of low hardware requirements. This reduces the cost and complexity of devices and battery usage. In order to ensure that the authentication is not compromised, a continuous confidence score may be determined and a state diagram such as that shown in FIG. 6 and FIG. 7 is maintained.

Referring to FIG. 6, a user identity 505 stores a unique identifier for each user. This is stored in column 505.

A device identifier is also stored in column 510. This uniquely identifies each device associated with the user. In this case, there are three devices uniquely identified as device 1, device 2, device 3. There is also an additional device (not shown) that is known to be close to the user. As noted above, this device may be attached to the user or embedded within the user. The location of each of device 1, device 2 and device 3 which was determined as explained below is then stored in column 515. In this example, the location of each of device 1, 2 and 3 is provided relative to the device known to be close to the user. In other words, in the example table in FIG. 6, device 1 is noted as being close to the device known to be close to user 1 and device 2 is located as being not close to the device known to be close to user 1. Device 3 is also located close to the device known to be close to user 1.

A confidence score is also provided in confidence score column 520. This provides a certain level of confidence of the nature of the location of the device. In the example of FIG. 6, the device 100 is 85% confident that device 1 is close to user 1. Similarly, device 100 is 82% confident that device 2 is not close to user 1 and 75% confident that device 3 is close to user 1. An explanation of the determination of the confidence score and the location of the device now follows.

Each piece of wearable technology (shown in FIG. 6 as device 1, 2, and 3) contains a microphone 135. The microphone 135 captures the ambient noise at regular intervals. For example, the microphone 135 captures 0.5 second samples of the ambient sound at 1 second intervals. The captured ambient sound is passed to a controller for processing.

The controller in each device 1, 2 and 3, converts the captured ambient sound to a time series of sound intensities using a known technique. The time series of sound intensities is passed to an authentication device 100 which maintains table 500. The table is stored within device 100. The table 500 is stored for authentication purposes as will be explained later. The transmission of a time series of sound intensities is useful as they contain little or no information about the user or the environment in which the user is located. This means even if the time series of sound intensities was hacked, no information would be compromised.

When received by the authentication device 100, the time series of sound intensities is cross-correlated. The cross-correlation is performed between each device and the device we know is close to the user. For example, in the example of FIG. 6, the time series of sound intensities from device 1 is cross-correlated with the time series of sound intensities from the device we know is close to the user. Similarly, the time series of sound intensities from device 2 and separately device 3 is cross-correlated with the time series of sound intensities from the device we know is close to the user. Cross correlation is a known technique and will not be described in any detail hereinafter.

It is envisaged that prior to cross-correlation, the time series will be converted to a frequency domain representation using a Fast Fourier Transform (FFT) or the like.

The output of the cross-correlation will determine how similar the ambient sounds are at the sample time. Where the level of similarity is at or above a threshold value, a continuous similarity score will be increased by an amount. Alternatively, where the level of similarity is below the threshold, the similarity score will be decreased by an amount.

Referring to FIG. 7, a state diagram 700 explaining the mechanism for maintaining the confidence score is shown. In FIG. 7, the state diagram 700 sets the proximity between the device known to be close to the user and, say, device 1 starts at "not close" 705. The sound intensity from the device known to be close to the user and device 1 is received at the device 100 periodically. Of course, device 100 may be one of these devices measuring the sound intensity. In examples, the sound intensity is received every 0.5 seconds. Of course, other periods are envisaged and these periods may or may not be regular. This is step 720 in the state diagram 700.

In step 725 a decision has to be made. Specifically, the controller 105 determines whether the cross-correlation of the sound intensity results in a match between the two received sound intensities. In this case, the match may be that the output of the cross-correlation is at or above a threshold of, say, 85%. If the sound intensities match, the "signals match increment score" path is followed to step 730. The continuous score associated with device 1 is incremented. In step 730, a decision is made. Specifically, the continuous score associated with device 1 is reviewed. In the event that the continuous score is at or above a threshold of, say, 80, device 1 is determined to be close to the device known to be close to the user. On the other hand, if the continuous score is below the threshold of, in this case, 80, then device 1 is deemed to be not close to the device which is known to be close to the user.

Returning now to step 725, if the cross-correlated signals is below the threshold of, in this case, 85%, the signals are deemed not to match and the continuous score is not incremented. The path 715 is followed to the determination in 705 that device 1 is not close to the device known to be close to the user.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A device for authenticating a user, comprising a sensor configured to measure the movement of a user in response to the interaction of the user with a displayed image and controller circuitry configured to authenticate the user in response to a positive comparison between the movement of the user and a stored movement associated with the user.
2. A device according to clause 1, comprising storage configured to store a user profile having associated therewith the stored movement and wherein the controller circuitry is configured to compare the movement of the user with the stored movement in the user profile, and in the event of a positive comparison, authenticating the user.
3. A device according to clause 1 or 2, wherein the sensor is an image sensor or a wearable sensor located on the user's body.
4. A device according to any preceding clause, wherein the displayed image is a virtual object associated with the user and the stored movement is associated with the virtual object.
5. A device according to any preceding clause, wherein the displayed image is one of a virtual keyboard.
6. A device according to clause 5, wherein the controller circuitry is further configured to authenticate the user in response to a positive comparison with entry of a predefined code associated with the user on the virtual keyboard.
7. A device according to clause 6, wherein the predefined code is a personal identification number.
8. A device according to any preceding clause, wherein the controller circuitry is configured to authenticate the user in accordance with a physiological trait of the user.
9. A device for authenticating a user, comprising microphone circuitry configured to capture the ambient sound over a predetermined period, and controller circuitry configured to: measure the energy of the ambient sound over a predefined period; compare the time series of the measured energy with a received time series of the measure of the energy of the ambient sound from a second device; and authenticate the user in the event of a positive comparison.
10. A device according to clause 9, wherein the microphone circuitry is configured to capture the ambient sound over a time period and to update a comparison result for each time period and to authenticate the user in the event that the comparison result reaches a predetermined threshold.
11. A method of authenticating a user, comprising measuring, using a sensor, the movement of a user in response to the interaction of the user with a displayed image and authenticating the user in response to a positive comparison between the movement of the user and a stored movement associated with the user.
12. A method according to clause 11, comprising storing a user profile having associated therewith a stored movement and comparing the movement of the user with the stored movement in the user profile, and in the event of a positive comparison, authenticating the user.
13. A method according to clause 11 or 12, wherein the sensor is an image sensor or a wearable sensor located on the user's body.
14. A method according to any one of clauses 11 to 13, wherein the displayed image is a virtual object associated with the user and the stored movement is associated with the virtual object.
15. A method according to any one of clauses 11 to 14, wherein the displayed image is one of a virtual keyboard.
16. A method according to clause 15, comprising authenticating the user in response to a positive comparison with entry of a predefined code associated with the user on the virtual keyboard.
17. A method according to clause 16, wherein the predefined code is a personal identification number.
18. A method according to any one of clauses 11 to 17, comprising authenticating the user in accordance with a physiological trait of the user.
19. A method of authenticating a user, comprising capturing, using microphone circuitry, the ambient sound over a predetermined period, and the method comprising measuring the energy of the ambient sound over a predefined period; comparing the time series of the measured energy with a received time series of the measure of the energy of the ambient sound from a second device; and authenticating the user in the event of a positive comparison.
20. A method according to clause 19, comprising capturing the ambient sound over a time period and updating a comparison result for each time period and to authenticate the user in the event that the comparison result reaches a predetermined threshold.
21. A computer program product comprising computer readable instructions which, when loaded onto a computer, configures the computer to perform the method according to any one of clauses 11 to 20

The invention claimed is:
1. A device for authenticating a user, comprising:
microphone circuitry configured to capture an ambient sound over a predetermined period, and
controller circuitry configured to:
measure the energy of the ambient sound over a predefined period;
compare the time series of the measured energy with a received time series of the measure of the energy of the ambient sound from a second device known to be close to the user, wherein the measured energy includes no personal information from the ambient sound; and
authenticate the user of the second device as the user of the device in the event of a positive comparison.
2. A device according to claim 1, wherein:
the microphone circuitry is configured to capture the ambient sound over a time period, and
controller circuitry is configured to update a comparison result for each time period and to authenticate the user in the event that the comparison result reaches a predetermined threshold.
3. A method of authenticating a user of a device, the method comprising:
storing a table that includes a device identifier for each device associated with the user and a location that indicates whether each device is close to the user;
capturing, using microphone circuitry, an ambient sound over a predetermined period measuring the energy of the ambient sound over a predefined period;
comparing the time series of the measured energy with a received time series of the measure of the energy of the ambient sound from a second device known to be close to the user; and
authenticating the user of the second device as the user of the device in the event of a positive comparison.
4. A method according to claim 3, further comprising:
capturing the ambient sound over a time period;
updating a comparison result for each time period; and
authenticating the user in the event that the comparison result reaches a predetermined threshold.
5. A method according to claim 3, wherein the measured energy includes no personal information from the ambient sound.
6. A method according to claim 3, wherein the table further includes a confidence score regarding a level of confidence associated with the location of each device.

7. A method according to claim 4, further comprising:
  storing a table that includes a device identifier for each device associated with the user, a location that indicates whether each device is close to the user, and a confidence score regarding a level of confidence associated with the location of each device.

8. A method according to claim 7, further comprising updating the location and the confidence score in the table when updating the comparison result.

9. A device for authenticating a user, comprising:
  a memory that stores a table that includes a device identifier for each device associated with the user and a location that indicates whether each device is close to the user;
  microphone circuitry configured to capture an ambient sound over a predetermined period, and
  controller circuitry configured to:
    measure the energy of the ambient sound over a predefined period;
    compare the time series of the measured energy with a received time series of the measure of the energy of the ambient sound from a second device known to be close to the user; and
    authenticate the user of the second device as the user of the device in the event of a positive comparison.

10. A device according to claim 9, wherein the table further includes a confidence score regarding a level of confidence associated with the location of each device.

11. A device according to claim 2, further comprising:
  a memory that stores a table that includes a device identifier for each device associated with the user, a location that indicates whether each device is close to the user, and a confidence score regarding a level of confidence associated with the location of each device.

12. A device according to claim 11, wherein the controller circuitry updates the location and the confidence score when updating the comparison result.

13. A non-transitory computer readable storage device having computer readable instructions that when executed by circuitry case the circuitry to:
  capture an ambient sound over a predetermined period
  measure the energy of the ambient sound over a predefined period;
  compare the time series of the measured energy with a received time series of the measure of the energy of the ambient sound from a second device known to be close to the user, wherein the measured energy includes no personal information from the ambient sound; and
  authenticating the user of the second device as the user of the device in the event of a positive comparison.

14. A non-transitory computer readable storage device according to claim 13, wherein the circuitry is to:
  capture the ambient sound over a time period;
  update a comparison result for each time period; and
  authenticate the user in the event that the comparison result reaches a predetermined threshold.

* * * * *